United States Patent [19]

Marshall

[11] Patent Number: 5,260,572
[45] Date of Patent: Nov. 9, 1993

[54] SCANNING PROBE MICROSCOPE INCLUDING HEIGHT PLUS DEFLECTION METHOD AND APPARATUS TO ACHIEVE BOTH HIGH RESOLUTION AND HIGH SPEED SCANNING

[75] Inventor: Daniel R. Marshall, Tucson, Ariz.
[73] Assignee: WYKO Corporation, Tucson, Ariz.
[21] Appl. No.: 929,676
[22] Filed: Aug. 13, 1992
[51] Int. Cl.$^5$ ............................................. H01J 37/28
[52] U.S. Cl. ..................................... 250/306; 250/307; 73/105
[58] Field of Search .................... 250/306, 307; 73/105

[56] References Cited

U.S. PATENT DOCUMENTS

| | | | |
|---|---|---|---|
| 4,724,318 | 2/1988 | Binnig | 250/306 |
| 4,889,988 | 12/1989 | Elings et al. | 250/306 |
| 4,954,704 | 9/1990 | Elings et al. | 250/307 |
| 4,987,303 | 1/1991 | Takase et al. | 250/306 |
| 5,059,793 | 10/1991 | Miyamoto et al. | 250/306 |
| 5,066,858 | 11/1991 | Elings et al. | 250/307 |

Primary Examiner—Jack I. Berman
Attorney, Agent, or Firm—Charles R. Hoffman

[57] ABSTRACT

A scanning probe microscope achieves increased resolution and speed in profiling a surface of a sample by producing an error signal representing a difference between a probe signal and a desired value of the probe signal. The error signal is compensated for delay in response of a position translator. The position translator moves in response to the compensated error signal to produce a change in the probe signal dependent upon how closely the probe moves along the sample surface. A signal representing height of the sample surface is produced by filtering and scaling the probe signal and summing the resulting signal with the compensated error signal. Both high frequency components of the probe signal and low frequency components of the compensated error signal are included in the sample surface height-representing signal, resulting in very high image resolution without sacrificing scanning speed.

15 Claims, 2 Drawing Sheets

SCANNING PROBE MICROSCOPE INCLUDING HEIGHT PLUS DEFLECTION METHOD AND APPARATUS TO ACHIEVE BOTH HIGH RESOLUTION AND HIGH SPEED SCANNING

BACKGROUND OF THE INVENTION

The invention relates to scanning probe microscopes, and particularly to a scanning probe microscope in which image resolution is achieved without a corresponding reduction in scanning speed.

In scanning probe microscopes (SPM's), such as scanning tunneling microscopes (STM's) and atomic force microscopes (AFM's), a probe tip or sensing element is suspended in relation to a sample surface by means of a PZT translator or the like. The probe tip generates a z position error signal which varies in accordance with the distance between the sample surface and the tip, or according to the atomic force applied to the tip (in the case of an AFM). Scanning probe microscopes are capable of revealing surface features of molecular size, far smaller than those observable by most other measurement techniques.

The interaction between the probe tip and the surface of the sample produces useful measurable variations representing the distance between the sample surface and the tip or the force applied by the sample surface to the tip only for a very restricted range of tip-to-surface distances or forces. For this reason, scanning probe microscopes usually employ several mechanisms to maintain the tip-to-sample signal at an approximately constant signal level. The surface topography then is assumed to be the same as the x,y,z coordinates of the servomechanism which varies the relative position of the probe tip and the sample by scanning in the x and y coordinate directions and using the servomechanism to cause the probe tip to "track" the sample surface in the z direction.

FIG. 4 shows the closest presently known prior art. In FIG. 4, the main components include a digital computer 30, with functional blocks 12 and 15 therein. Block 12 algebraically sums a digital "set point" on bus 11 and a filtered probe signal on bus 13A and produces the result (difference) as a digital error signal on bus 14. Block 15 functions as a digital compensating element to slow down the servo loop response to allow time for the mass of a PZT piezoelectric transducer/actuator 21 and the mass of a stage and sample or a probe carried by it to respond in a conventional manner to z control signal 20. Functional blocks 12 and 15, digital-to-analog converter (DAC) 17, amplifier 19, actuator 21, sample 23 (the topography of the surface of which is to be measured), probe 25, analog-to-digital converter (ADC) 27, and filtering function 31 constitute a typical servo loop.

Note that although algebraic summing function 12 and compensation function 15 are implemented inside digital computer 30, both could be performed by hardware, rather than software.

The set point is applied via digital bus 11 to algebraic summing function 12, and the difference between set point 11 and digitized and filtered probe signal 13A is equal to the error signal on bus 14. The servo loop adjusts actuator 21 so that the error signal 14 approaches zero, so that digitized probe signal 26 ideally remains equal to set point signal 11.

In FIG. 4, the servo loop signal amplitude and phase parameters are set to cause actuator 21 to follow rapid changes in the relative z position of probe 25 and the surface of sample 23 so as to maintain the error signal 14 as close to zero as possible. The z control signal 20 input to actuator 21 is determined by the compensated digital error signal 16 applied to the inputs of DAC 17. The z coordinate 16 input to DAC 17 also is input to a display system 29 in computer 30 that displays the surface topography of sample 23 as x, y scanning and z direction tracking by probe 25 progresses.

A major problem with the prior art system of FIG. 4 is that it can be relatively slow, that is, its image resolution is poor due to the relatively high mass which has to be moved by actuator 21 and the speed with which that mass needs to be moved, especially if the surface of sample 23 is very rough. If reasonably fast profiling of the sample surface is desired, the above mentioned delay in movement of the mass in response to z control signal 20 causes a loss of resolution of the sample surface image.

Scanning probe microscopes of the type shown in FIG. 4 are capable of resolving features as small as a tenth of a nanometer, which is small enough to show detail at the scale of atomic lattices. Servomechanism loop parameters are adjustable to allow scanning distances of hundreds of micrometers, while still retaining resolution of a few nanometers. However, the technique illustrated in FIG. 4 has the primary disadvantages that the amount of mass moved by the servomechanism may be large enough (especially if the sample stage and sample are supported thereon as in FIG. 3A) to limit the response speed of the PZT actuator, thus either limiting the scanning speed or blurring the features of the sample surface being scanned due to delay between actuator response and the digital input 16 to DAC 17. Furthermore, the effect of the compensation function 15 is likely to further modify the surface topography information, causing a further loss in resolution. The simultaneous requirement for high resolution and a large scan range typically requires a large number of digitization levels in the servo loop, increasing the cost of the instrument and potentially further reducing scanning speeds, especially if the summing, compensation, and filtering functions all are performed by a digital computer.

Another prior approach to SPM implementation is structurally very similar to that shown in FIG. 4, except that 1) the servomechanism loop parameters are set so that actuator 21 responds only to very slow changes in error signal 14, and 2) the output 13A of ADC 27 rather than the input of DAC 17, is input to display system 29. Dotted line 13A in FIG. 4 illustrates this alternative. Consequently, the scanning surface-to-probe tip interaction (distance or force) is not maintained constant and instead is a dynamically varying parameter representing varying sample surface features. This implementation results in very high resolution of the surface image at high scanning speeds for small surface features, but is severely limited by the short range of the tip to sample surface interaction. As a practical matter, this implementation is not as commonly used as the other.

SUMMARY OF THE INVENTION

Accordingly, it is an object of the invention to achieve faster scanning of a scanning probe microscope without loss of image resolution, or, to achieve improved image resolution without a loss of image scanning speed.

It is another object of the invention to achieve a higher scanning range of a scanning probe microscope without loss of image resolution and/or image scanning speed.

It is another object of the invention to provide a scanning probe microscope control system which allows convenient optimization of servomechanism loop parameters for desired scanning speed, image resolution, and/or scanning range.

It is another object of the invention to provide convenient balancing of emphasis of high frequency and low frequency information in a servo loop of a scanning probe microscope for various applications.

It is another object of the invention to reduce the cost of a scanning probe microscope without reducing resolution or scanning speed by allowing use of low cost analog-to-digital converters and digital-to-analog converters in a servo loop thereof.

It is another object of the invention to provide a servomechanism which combines high frequency components and low frequency components of signals in the servo loop representing the position of an actuator therein.

Briefly described, and in accordance with one embodiment thereof, the invention provides a system for operating a scanning probe microscope to achieve increased resolution and speed in profiling a surface of a sample. The scanning probe microscope includes a position translator and a probe sensing element producing a probe signal representative of a degree of interaction between the probe sensing element and the sample surface. An error signal is produced representing a difference between the probe signal and a desired value of the probe signal. The error signal then is compensated for position translator response delay. The position translator then is caused to move in response to the compensated error signal, producing a change in the amount of the interaction between the sample surface and the probe sensing element. The probe signal rapidly and precisely indicates the change, and therefore contains high frequency signal components. A signal representing height of the point of the sample surface closest to the probe sensing element is produced by scaling the probe signal and summing the scaled probe signal with the compensated error signal. Both high frequency components of the probe signal and low frequency components of the compensated error signal are included in the sample surface height representing signal, so high image resolution and high speed scanning both are achieved. The position translator is scanned along x and y coordinate directions, and tracking of the sample surface occurs along in a z coordinate direction. The amount of interaction can be an amount of tunnelling current related to the distance between the probe sensing element and the surface of the sample or the amount of force applied by the surface of the sample to a atomic force measuring element of the probe sensing element. In the described embodiments, a digital computer is operated to produce the error signal in digital form and to digitally compensate the error signal. The compensated error signal then is converted to an analog signal. The probe signal is converted to digital form and filtered, and the digital computer scales the resulting version of the probe signal and sums it with the digitally compensated error signal. The resulting height representing signal is applied to a display system that displays the x,y,z coordinates of the scanned points of the sample surface on a screen.

DETAILED DESCRIPTION OF THE PREFERRED EMBODIMENTS

Figure 1:
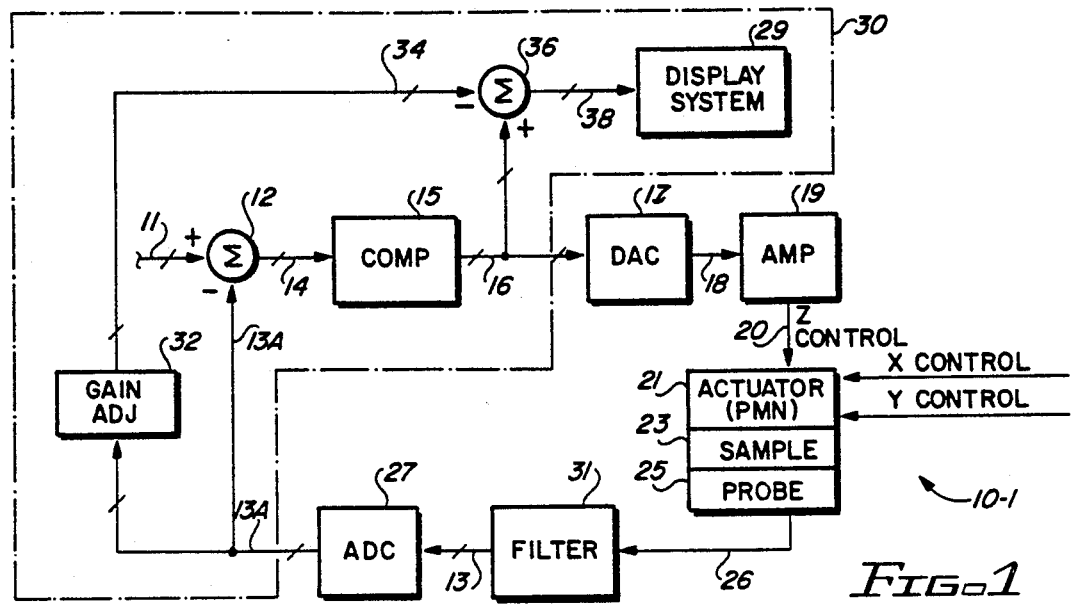
FIG. 1 is a block diagram of a scanning probe microscope of the present invention.
Figures 3A, 3B:
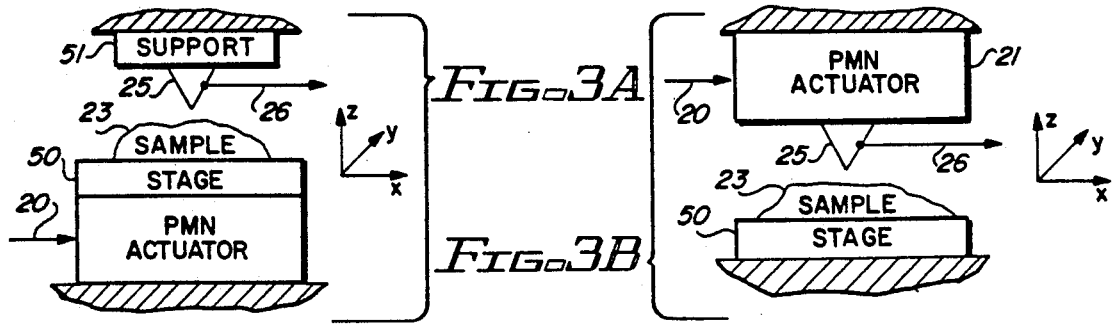
FIG. 3A is a diagram illustration one configuration of the probe, sample, and actuator of FIGS. 1, 2, and 4.
FIG. 3B is a diagram illustration another configuration of the probe, sample, and actuator of FIGS. 1, 2, and 4.

Referring to FIG. 1, scanning probe microscope 10-1 includes an electrostrictive actuator 21 which can be made, for example, from Lead, Magnesium, Niobate—here called PMN), a sample 23 the surface of which is to be profiled, and a probe 25 that includes a suitable tip for interacting with the sample surface. Actuator 21, sample 23, and probe 25 are arranged as shown in FIG. 3A or FIG. 3B. FIGS. 3A and 3B show two possible arrangements of actuator 21, sample 23, and probe 25. In FIG. 3A, probe 25 is stationary. Probe 25 is a conductive probe or an atomic force measurement probe. Conductor 26 products on conductor 26 a minute electrical signal that either indicates the amount of current flowing through probe 25 or the deflection thereof produced by the surface of sample 23. Sample 23 is scanned in the x and y directions by conventional control circuitry or connections (not shown). Actuator 21 supports sample stage 50 on which sample 23 is mounted. z control signal 20 from amplifier 19 controls "tracking" of the surface of sample 23 in the z direction in response to the servo loop, which is controlled by the probe signal 26.

FIG. 3B shows another possible arrangement of PZT actuator 21, sample 23, and probe 25, in which probe 25 (rather than sample 23) is mounted on the PZT actuator 21. In this case, sample 23 is mounted on stationary support or stage 50. The probe signal produced on conductor 26 is the same for either the configuration of FIG. 3A or FIG. 31B, as it does not matter which of probe 25 and sample 23 is stationary and which moves.

Probe 25 produces a probe signal on conductor 26, which is connected to the input of filter 31, the output 13 of which is connected to the input of analog-to-digital converter (ADC) 27. In a present prototype of the invention, ADC 27 is a Burr Brown AD808JH. The output of ADC 27 is connected by 16 bit digital bus 13A to computer 30, which in the prototype is a Dell 486P/50. A conventional filtering function is performed on the signal applied to the input of ADC 27. The set point on bus 11 is input to computer 30 via a keyboard to be stored in a suitable memory location. Digital bus 13A conveys a digitized and filtered probe signal to a gain adjustment function performed in computer 30, which multiplies it by a suitable gain factor relating the probe calibration to the units of the sample profile being measured. A scaled probe signal produced on bus 34 by gain constant function 32 is input to auxiliary summing function 36 performed by computer 30.

The filtered, digitized probe signal 13A is algebraically summed with set point 11 to produce a difference or signal 14, which is input to digital compensation function 15. (Digital compensation function 15 simply performs a conventional adjustment of loop amplitude and phase parameters so as to produce loop stability.) The compensated error signal 16 produced by compensation function 15 is input to DAC 17 and to auxiliary summing function 36, the output 38 of which contains both the high frequency components of rapid transients contained in probe signal 26 and also low frequency or DC components of the compensated error signal 16 input to DAC 17. DAC 17 can be a Burr-Brown DAC 707JB.

The analog output 18 of DAC 17 is applied to the input of amplifier 19, which can be an Apex M Technology PA88. The output of amplifier 19 is connected by conductor 20 to supply the z control signal to actuator 21, which can be an electrostrictive or piezostrictive actuator.

The servo loop parameters (i.e., amplitude and phase parameters) of FIG. 1 are set to cause actuator 21 to respond only to relatively slow, low frequency changes of error signal 14 in such a way that the servo loop remains stable. This inevitably causes loss of high frequency information and consequently causes loss of image resolution information in the digital signal 16 input to DAC 17 to control the actuator position. Analog-to-digital converter 27 produces signals on digital bus 13 that accurately represent both high frequency "transient" components and the low frequency or DC components of probe signal 26.

The filtered, digitized probe signal 13A, including high frequency transient components of surface topography, is amplified by gain function 32 in computer 30, and then is algebraically summed by auxiliary summing function 36 with the same compensated digital signal 16 that is applied to the input of DAC 17. The latter signal represents low frequency or "DC" components of probe signal 26 such as would be produced by scanning a smooth region of the surface of sample 23. Note that if the surface topography is such that the PMN actuator can "follow" all sample surface features there will be no transient contribution signal on conductor 34, and the circuit will operate the same as the prior art circuit of FIG. 4. The output of auxiliary summing function 36 thus contains both the Average Height (low frequency) and Deflection (high frequency) components of the z coordinates of the sample surface. (The digital filtering of block 31 is conventional, for the purpose of avoiding aliasing of the image and to limit the servo loop bandwidth to that which can be displayed so that higher frequency noise is kept out of the servo loop.)

Consequently, very good image resolution and fast scanning both are achieved, unlike the prior art in which accuracy (i.e., resolution) is sacrificed if speed is needed. Since both high frequency and low frequency changes in probe signal 26 are contained in the z coordinate number on digital bus 38 applied to the display system, extremely good resolution in the image of the surface of sample 23 is obtained during high speed x,y scanning.

Figure 2:
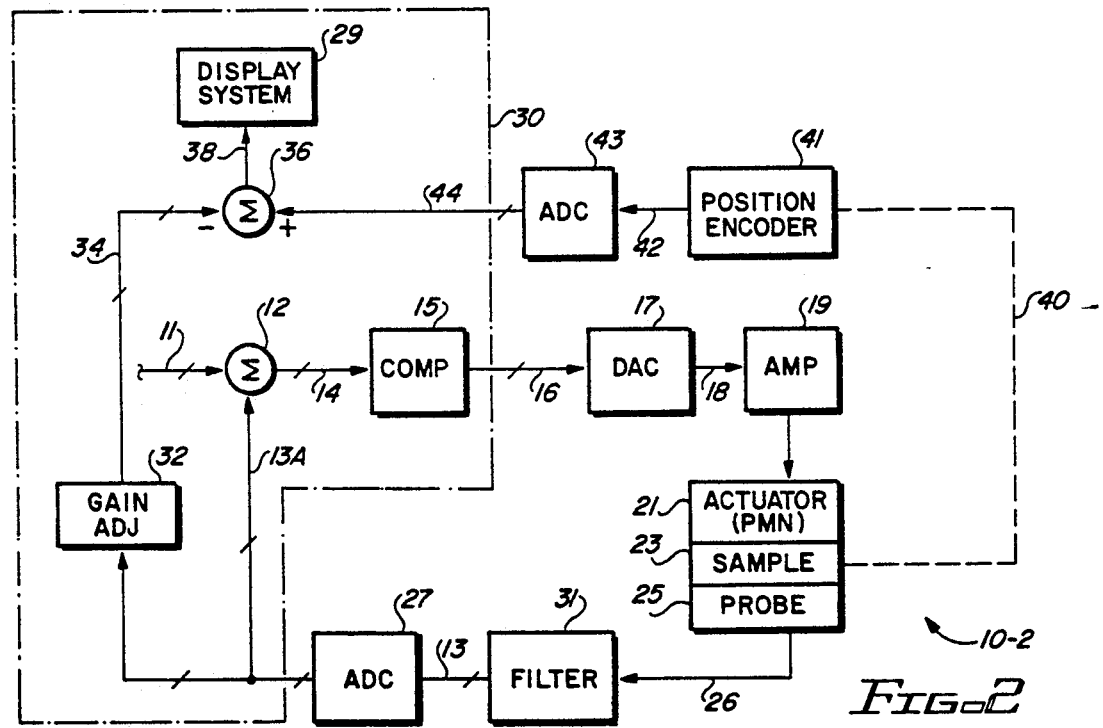
FIG. 2 is a block diagram of another scanning probe microscope of the present invention.

FIG. 2 shows a slightly modified version of the present invention in which the low frequency components representing the z position of actuator 21 are measured by a conventional vertical position encoder 41 that physically measures the position of actuator 21 (and hence the relative position between the sample surface and the probe tip). Position encoder 41 can be a conventional optical, capacitive or inductive position sensor. Dotted line 40 designates magnetic, electrical, or optical coupling between position encoder 41 and activator 21 that causes it to generate Average Height signal 42, which is applied to the input of a second ADC 43. (The ADC output on bus 44 more accurately represents the low frequency components of the z coordinate of the surface sample 23 than the digital input 16 to DAC 17 in FIG. 1.) The digital signal 44 is algebraically summed with the transient high frequency probe signal components on digital bus 34 by summing function 36 in computer 30, producing a digital z coordinate signal 38 containing both high frequency and low frequency components of the sample surface z coordinates. Signal 38 is supplied to display system 29.

Figure 4:
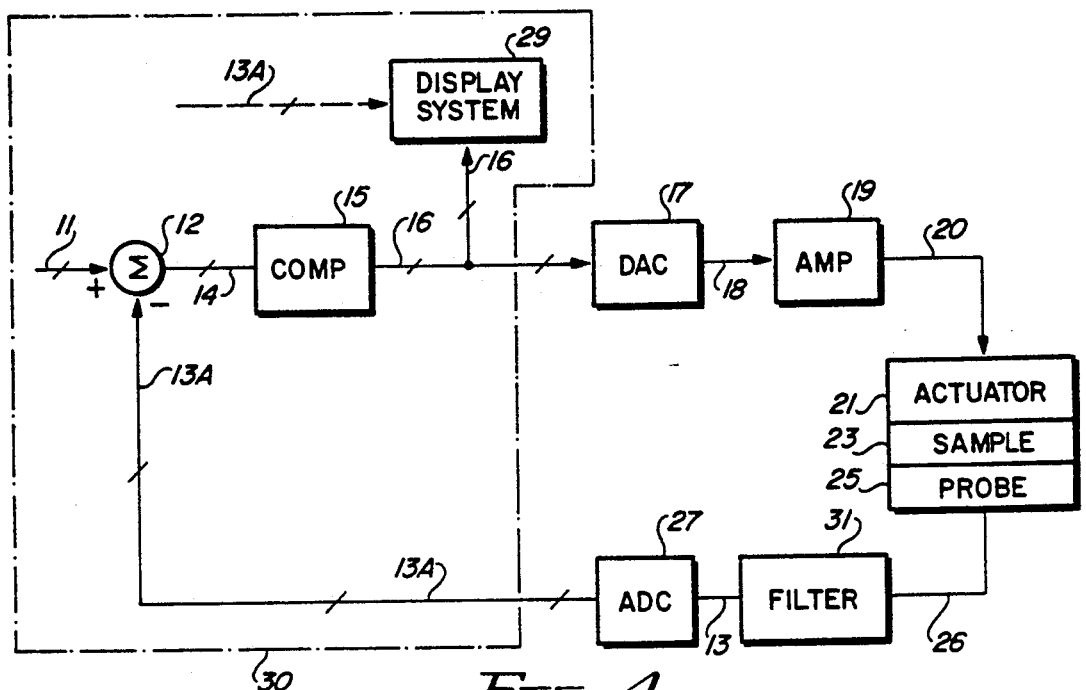
FIG. 4 is a block diagram of a prior art scanning probe microscope.

The above described "Average Height plus Deflection" technique has the advantage of combining the best features of both the prior constant height method and prior constant signal method previously described with reference to FIG. 4. In scanning probe microscopes 10-1 and 10-2 of FIGS. 1 and 2, the servo loop parameters are set approximately the same as for the constant height SPM servo loop as described with reference to prior art FIG. 4. DAC 17 serves the function of control and memory for actuator 21.

In accordance with the invention, the appropriately scaled, filtered, digitized probe signal 34 contains rapidly varying error information which is lost in the above described constant probe signal technique described with reference to FIG. 4 because of the slow response of actuator 21. Since the probe tip to sample surface interaction can vary much more rapidly than actuator 21 can respond to z control signal 20, scanning probe microscopes 10-1 and 10-2 can have dramatically higher image resolution than is achievable by the constant height technique at high scanning speeds.

- Scanning probe microscopes 10-1 and 10-2 also permit use of an ADC with limited range, so residual surface information contained in the probe signal that otherwise would be lost can be recovered, allowing resolution and speed to be optimized despite non-ideal behavior of the actuator and other components of the servo loop. Furthermore, by varying the scaling factor that determines the "emphasis" or weight given to high frequency information, the user can choose a relative emphasis of the high frequency information and low frequency information suitable to particular applications, as for image edge enhancement purposes. By adjusting servo loop parameters appropriately, the user can make certain measurements using primarily the gain characteristics of the digitized probe signal as opposed to the mechanical gain characteristics of the actuator, thereby minimizing the effective non-linearity and hysteresis errors in the PZT actuator.

Figure 5:
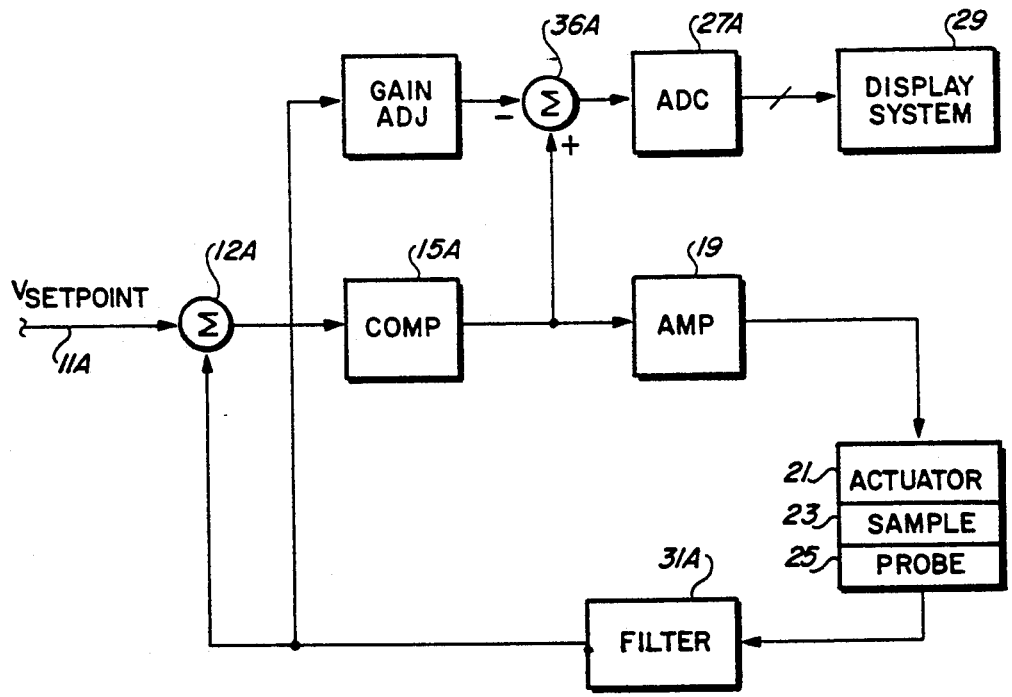
FIG. 5 is a block diagram of a primarily analog implementation of the scanning probe microscope of the present invention.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention. For example, the servo loop can be implemented using all analog components, as shown in FIG. 5. In FIG. 5, the set point voltage $V_{SETPOINT}$ on conductor 11A is input to an analog summing circuit 12A. The compensation circuit 15A, filter 31A, gain adjust circuit 32A, and auxiliary summing circuit 36A all are analog circuits. Only after the low frequency or DC compensated error signal 16A produced by compensation circuit 15A has been summed with the filtered and gain-adjusted probe signal 34A is the resulting signal 38A containing both high frequency and low frequency components digitized by ADC 27A and input to a display system 29. Alternatively, the output of compensation circuit 15A and the output of gain adjust circuit 32A each could be digitized before being summed.

What is claimed is:

1. A method for operating a scanning probe microscope to achieve increased resolution and speed in profiling a surface of a sample, the scanning probe microscope including a position translator and a probe sensing element producing a probe signal representative of an amount of interaction between the probe sensing element and a point of the sample surface closest to the probe sensing element, the method comprising the steps of:
   (a) producing an error signal representing a difference between the probe signal and a desired value of the probe signal;
   (b) compensating the error signal for position translator response delay;
   (c) causing movement of the position translator in response to the compensated error signal to produce a change in the amount of the interaction between the sample surface and the probe sensing element, the probe signal rapidly and precisely indicating the change; and
   (d) producing a signal representing a height of the sample surface by scaling one of the compensated error signal and the probe signal and summing the one with the other, whereby both components characteristic of the probe signal and components characteristic of the compensated error signal are included in the sample surface height representing signal.

2. The method of claim 1 wherein the movement of step (c) is in a z coordinate direction of an x,y,z cartesian coordinate system, the z coordinate direction being a direction of height of the sample surface generally perpendicular to the sample surface, the method including causing scanning by the position translator in the x and y coordinate directions, and repeating steps (a) through (d) for a plurality of x,y coordinate locations as the x and y scanning progresses.

3. The method of claim 2 wherein the amount of interaction of step (c) corresponds to an amount of tunneling current flowing between the probe sensing element and the surface of the sample.

4. The method of claim 2 wherein the probe sensing element includes an atomic force measuring element, and the amount of interaction corresponds to an amount of force applied to the atomic force measuring element by the surface of the sample.

5. The method of claim 2 including operating a digital computer to produce the error signal in digital form in step (a), and to digitally compensate the error signal in step (b), the method including converting the compensated error signal in step (c) to an analog signal before performing step (c).

6. The method of claim 5 including converting the probe signal to digital form before step (a) and wherein step (d) includes operating the digital computer to scale the probe signal and to sum the scaled probe signal with the digitally compensated error signal.

7. The method of claim 6 including supplying the height representing signal to a display system and displaying the x,y,z coordinates of the surface of the sample on a screen of the display system.

8. The method of claim 6 wherein step (a) is performed by algebraically summing a digital set point representing a desired value of the probe signal with an amplified version of the probe signal in digital form.

9. A scanning probe microscope including
   (a) a position translator;
   (b) a probe sensing element producing a probe signal representative of an amount of interaction between the probe sensing element and a point of the sample surface closest to the probe sensing element;
   (c) means for producing an error signal representing a difference between the probe signal and a desired value of the probe signal;
   (d) means for compensating the error signal for position translator response delay;
   (e) means for causing movement of the position translator in response to the compensated error signal to produce a change in the amount of the interaction between the sample surface and the probe sensing element, the probe signal rapidly and precisely indicating the change; and
   (f) means for producing a signal representing a height of the sample surface by scaling one of the compensated error signal and the probe signal and summing the one with the other, whereby both components characteristic of the probe signal and components characteristic of the compensated error signal are included in the sample surface height representing signal.

10. The scanning probe microscope method of claim 9 wherein the movement of the position translator is in a z coordinate direction of an x,y,z cartesian coordinate system, the z coordinate direction being a direction of height of the sample surface generally perpendicular to the sample surface, the S.P.M. including means for causing scanning by the position translator in the x and y coordinate directions.

11. The scanning probe microscope of claim 10 wherein the amount of interaction corresponds to an amount of tunneling current flowing between the probe sensing element and the surface of the sample.

12. The scanning probe microscope of claim 10 wherein the probe sensing element includes an atomic force measuring element, and the amount of interaction corresponds to an amount of force applied to the atomic force measuring element by the surface of the sample.

13. The scanning probe microscope of claim 10 including perating a digital computer operating to produce the error signal in digital form, and to digitally compensate the error signal, the movement causing means including a digital to analog converter converting the compensated error signal to an analog signal that is applied to the position translator c.

14. The scanning probe microscope of claim 13 including an analog to digital converter converting the probe signal to digital form and means for operating the digital computer to scale the probe signal and to sum the scaled probe signal with the digitally compensated error signal.

15. The scanning probe microscope of claim 14 including a display system in the digital computer and means for operating the computer to display the x,y,z coordinates of the surface of the sample on a screen of the display system.

* * * * *